(12) United States Patent
Chervirala

(10) Patent No.: US 8,589,802 B2
(45) Date of Patent: Nov. 19, 2013

(54) METHOD AND SYSTEM TO SERVE THE DYNAMIC RELEVANT ADVERTISEMENTS FROM THE ACCESS NODE

(75) Inventor: Srinivas Chervirala, Sunnyvale, CA (US)

(73) Assignee: France Telecom, Paris (FR)

( * ) Notice: Subject to any disclaimer, the term of this patent is extended or adjusted under 35 U.S.C. 154(b) by 326 days.

(21) Appl. No.: 12/895,641

(22) Filed: Sep. 30, 2010

(65) Prior Publication Data

US 2011/0078581 A1 Mar. 31, 2011

Related U.S. Application Data

(60) Provisional application No. 61/247,556, filed on Sep. 30, 2009.

(51) Int. Cl.
*G06F 3/00* (2006.01)

(52) U.S. Cl.
USPC .......................................................... 715/744

(58) Field of Classification Search
USPC ................. 715/744; 725/34, 35; 705/10, 14
See application file for complete search history.

(56) References Cited

U.S. PATENT DOCUMENTS

| | | | | |
|---|---|---|---|---|
| 5,442,771 A | * | 8/1995 | Filepp et al. | 709/219 |
| 5,664,948 A | * | 9/1997 | Dimitriadis et al. | 434/307 R |
| 5,838,458 A | * | 11/1998 | Tsai | 358/402 |
| 5,848,397 A | * | 12/1998 | Marsh et al. | 705/14.61 |
| 5,999,912 A | * | 12/1999 | Wodarz et al. | 705/14.61 |
| 6,414,602 B2 | * | 7/2002 | Polyakov | 340/691.6 |
| 6,954,728 B1 | * | 10/2005 | Kusumoto et al. | 705/14.4 |
| 7,194,424 B2 | * | 3/2007 | Greer et al. | 705/14.66 |
| 8,175,921 B1 | * | 5/2012 | Kopra | 705/14.58 |
| 8,250,456 B2 | * | 8/2012 | Vora et al. | 715/205 |
| 2002/0059610 A1 | * | 5/2002 | Ellis | 725/58 |
| 2002/0087402 A1 | * | 7/2002 | Zustak et al. | 705/14 |
| 2006/0085263 A1 | | 4/2006 | Greer et al. | |
| 2006/0167747 A1 | * | 7/2006 | Goodman et al. | 705/14 |
| 2007/0078989 A1 | * | 4/2007 | van Datta et al. | 709/227 |

(Continued)

OTHER PUBLICATIONS

Meyers et al., "A Secure, Publisher-Centric Web Caching Infrastructure", Department of Electrical and Computer Engineering, Carnegie Mellon University, School of Information Management and Systems, University of California, Berkeley, Department of Computer Science, Carnegie Mellon University, pp. 1-11, 2001.

(Continued)

*Primary Examiner* — Phenuel Salomon
(74) *Attorney, Agent, or Firm* — Westman, Champlin & Koehler, P.A.; David D. Brush

(57) ABSTRACT

An access node grants a telecommunication device access to a content provider over a telecommunication network. The content includes a webpage having ad spaces for displaying banners ads uploaded from banner ad providers when the webpage is displayed on the telecommunication device. The access node is configured to forward a request for a first webpage sent by the telecommunication device to the content provider, receive the first webpage from the content provider, the first webpage including an ad spaces for banner ad(s), verify that the first ad space is tagged by the content provider with an indication identifiable by the access node, modify the first webpage to include in the first ad space a banner ad selected by the access node, when the first ad space is tagged with such the indication, and forward the modified first webpage for subsequent display of the first webpage on the telecommunication device.

14 Claims, 6 Drawing Sheets

(56) References Cited

U.S. PATENT DOCUMENTS

| | | | |
|---|---|---|---|
| 2007/0079326 A1* | 4/2007 | Datta et al. | 725/34 |
| 2007/0192184 A1* | 8/2007 | Cai et al. | 705/14 |
| 2008/0004954 A1* | 1/2008 | Horvitz | 705/14 |
| 2008/0082400 A1* | 4/2008 | Martel et al. | 705/10 |
| 2009/0070873 A1* | 3/2009 | McAfee et al. | 726/23 |
| 2009/0183081 A1* | 7/2009 | Rodriguez et al. | 715/733 |
| 2010/0010898 A1* | 1/2010 | Matsumoto | 705/14.58 |

OTHER PUBLICATIONS

Cao et al., "Active Cache: Caching Dynamic Contents on the Web" Computer Sciences Department University of Wisconsin-Madison Published in Proceeding Middleware '98 Proceedings of the IFIP International Conference on Distributed Systems Platforms and Open Distributed Processing pp. 373-388, Springer-Verlag London, UK 1998.

* cited by examiner

METHOD AND SYSTEM TO SERVE THE DYNAMIC RELEVANT ADVERTISEMENTS FROM THE ACCESS NODE

CROSS-REFERENCE TO RELATED APPLICATION

This application claims the benefit of U.S. Provisional Patent Application No. 61/247,556, filed Sep. 30, 2009, incorporated herein by reference thereto.

FIELD OF THE PRESENT SYSTEM

The present system relates generally to the customization of advertisements and more specifically to the transmission of such ads over a computer network.

BACKGROUND OF THE PRESENT SYSTEM

Today there is an explosion of information accessible through the Internet, bringing in more and more audience. If this communication medium was at first promising for advertisers to reach this increasing audience, it becomes harder and harder for today's advertising networks to efficiently target internet users.

One possible way to reach out to Internet users is through web banners (banner ads in short) that can be seen as a specific form of advertising on the World Wide Web. This form of online advertising consists in embedding an advertisement into a web page. It is intended to attract traffic to a website by linking the internet user to the website of the advertiser. The advertisement is constructed from an image (GIF, JPEG, PNG), JavaScript program or multimedia object employing technologies such as Silverlight, Java, Shockwave or Flash, often employing animation or sound to maximize presence. Images are usually in a high-aspect ratio shape (i.e. either wide and short, or tall and narrow), hence the reference to banners. These images are usually placed on web pages that have interesting content to users, such as e.g. a newspaper article, sports news, or an opinion piece.

A web banner is displayed when a web page that references the banner ad is loaded into a web browser. An illustration of a known system for displaying a web banner ad is shown in FIG. 1A. A communication device 100 (for instance a computer, laptop, smart phone and the likes) is equipped with a web browser to upload a webpage provided by a content provider 120, for instance located through use of the Internet at cnn.com, applestore.com . . . . The content provider 120 generally defines/allocates regions or spaces in its webpages that are reserved for the insertion of the banner ads. Banner ad inventories 111 are available from banner ads providers 110, also called ad servers or ad publishers. The content provider generally has agreements with a number of banner ad providers (BAP) for choosing what banner ads may be inserted in allocated regions (or spaces) of their webpages.

An illustration of a known method for pushing (i.e. inserting) a banner ad to the telecommunication device of a first party in an uploaded webpage is illustrated in FIG. 1B. A first party using the telecommunication device 100 may be for instance a user or subscriber to an internet service provider (ISP), shown through the ISP upper section in the FIG. 1A. This first party may have access to content providers 120 through the ISP, like for instance through an access node 105. The access node may also be referred to as an access point, or internet gateway. In a preliminary act 130, the first party requests content, namely a webpage, from a content provider 120 through the access node 105. This may be achieved through an http request (Hypertext Transfer Protocol) sent to the content provider 120 over the ISP network. The request which may transit over the internet if the content provider is outside the ISP network. The ISP network will also be referred to as the operator or carrier network as today ISP offers more services such as telephony, TV, content such as media and the like.

In a further act 140, the content provider and/or the BAP may choose/select a banner ad for insertion in the webpage through scripting instructions related to that ad. These scripting instructions, or plugin, are provided by the banner ad provider 110 to the content provider 120. The scripting instructions related to the selected banner ad are instructions in a scripting language, which, when executed for instance in a web browser application, will retrieve this selected ad from an ad inventory 111 of the banner ad provider 110.

These scripting instructions, also referred to as a plugin here after, may comprise generally:
 a selected ad to be inserted in the allocated region of the webpage,
 an address for the banner ad inventory 111, from which the selected banner ad can be retrieved, and,
 the address or the name of the content provider, which selected the ad (e.g. for revenue purposes).

In a further act 150, the first party uploads the webpage sent by the content provider 120 and received from the access node 105, which causes the browser application to execute the scripting instructions. As a consequence, using the information embedded in these instructions, one or more http requests are sent to the banner ad inventory 111 for fetching the banner ad chosen by the content provider and/or BAP. The banner ad inventory will reply to these http requests with the chosen banner ad which is subsequently loaded and displayed in the webpage (act 160) in the allocated region. One may note that these ads generally appear in the allocated regions with some latency, i.e. after the data linked to the content provider 120 itself are loaded. This is due to the fact that the webpage needs to be uploaded in the browser application to cause the execution of the scripting instructions.

When the first party clicks on the banner ad, he is directed to the website advertised in the banner ad as the banner ad generally comprises a re-direction link for redirecting the first party to the advertised website. The advertised website may then record a visit from the initial webpage of the content provider. The content provider may itself keep a record of the clicking on the banner ad. Each click on a banner ad and the subsequent redirecting will generate revenue for the content provider.

Through the agreement with banner ad providers 110 (BAP), the content provider 120 knows which ads are available. The banner ads are generally identified through a tag or identifier. These ad tags are parameters passed on to the scripting instructions and are subsequently in the http requests to the banner ad provider that can thus identity the chosen banner ad.

One problem today is that the banner ads are chosen randomly. When loading several times in a row an Internet accessible web page, such as available at yahoo.com or cnn.com for instance, the banner ads will keep on changing randomly with no apparent logic. After a number of uploads of the same page, the same ads will appear again, which gives at most an indication of the BAPS the content provider has an agreement with. No targeting of the chosen ad seems to come into play.

As a direct consequence, ISPs offering free access to the internet did not generate the revenues they could hope for from the advertisements. Indeed, the existing solutions offer banner ads of generally no interest to a user, as they are at best restricted to the content provider's choices. Any selection of a banner ad will only bring revenue to the content provider.

It would be interesting at this point if the banner ad could be chosen based on the ISP's interests to better target the needs of a user using its Internet services.

US2006085263 proposes a method and apparatus for targeting advertising content. A content provider generates ad banners. The content provider transmits an agent to a target computer. The agent obtains user information and transmits the user information to the content provider. A program running on the content provider organizes the user information and updates a user specific database wherein all targeted banner ads are stored for a subsequent push to the target computer.

In this proposed solution, an agent needs to be downloaded to the targeted computer. Furthermore, a pre-storing (in the user specific database) of targeted ads is needed, which will require a lot of data storage if the method is generalized to a lot of target computers.

Today there is still a need for a simple and straightforward method for providing targeted banner ads to users as chosen by an ISP. Additionally, in order to build a successful ecosystem around free Internet access, the ISP (or infrastructure providers) should get fairly compensated through significant revenues from the banner ads.

SUMMARY OF THE PRESENT METHOD AND SYSTEM

It is an object of the present system to overcome disadvantages and/or make improvements in the prior art.

To that extend, the present system proposes an access node for granting a telecommunication device access to a content provider over a telecommunication network, the content being in the form of a webpage comprising one or more ad spaces for displaying banners ads uploaded from banner ad providers when said webpage is displayed on said telecommunication device, the access node being operable to:
  forward a request for a first webpage sent by the telecommunication device to the content provider,
  receive the first webpage from the content provider, said first webpage comprising one or more ad spaces for banner ad(s),
  verify that at least one first ad space has been tagged by the content provider with an indication identifiable by the access node,
  modify the first webpage to include in the first ad space a banner ad selected by the access node, when the first ad space is tagged with such an identifiable indication,
  forward the modified first webpage for subsequent display of said first webpage on the telecommunication device, thereby granting said telecommunication device access to the content provider.

With the present access node, attached for instance to an operator's or ISP network, a tradeoff between granting access to the first webpage of the content provider and controlling at least one ad space in that webpage is carried out. With existing systems, the banners ads are under the control of the content provider. Access nodes which offer for instance free access to the content provider do not get a chance of the banner ad revenues. With the present tradeoff, as the content provider tags at least one ad space in the requested first webpage with an indication identifiable by the access node, the access node can select at least one banner ad to get a share of the revenues that the requested webpage may generate. Thus the access node will grant a user access to content providers which are willing to give away at least one ad space in each webpage that the user may request through the access node.

The tag, i.e. the identifiable indication, as introduced by the content provider, is the indication the access node is looking for to grant access to the webpage.

The present method proposes a method for granting a telecommunication device access to a content provider over a telecommunication network, the content being in the form of a webpage comprising one or more ad spaces for displaying banners ads uploaded from banner ad providers when said webpage is displayed on said telecommunication device, said method being carried out by an access node of said telecommunication network and comprising the acts of:
  forwarding a request for a first webpage sent by the telecommunication device to the content provider,
  receiving the first webpage from the content provider, said first webpage comprising one or more ad spaces for banner ad(s),
  verifying that at least one first ad space has been tagged by the content provider with an indication identifiable by the access node,
  modifying the first webpage to include in the first ad space a banner ad selected by the access node, when the first ad space is tagged with such an identifiable indication,
  forwarding the modified first webpage for subsequent display of said first webpage on the telecommunication device, thereby granting said telecommunication device access to the content provider.

The present system also relates to telecommunication system comprising:
  a telecommunication device operable to request access to a content provider over a telecommunication system,
  a content provider, operable to provide the requested content to the telecommunication device, the requested content being in the form of a webpage comprising one or more ad spaces for displaying banners ads uploaded from banner ad providers when said webpage is displayed on said telecommunication device,
  at least one banner ad provider for uploading banner ads displayed on a webpage provided by the content provider,
  an access node for granting the telecommunication device access to the content provider, said access network being operable to:
  forward a request for a first webpage sent by the telecommunication device to the content provider,
  receive the first webpage from the content provider, said first webpage comprising one or more ad spaces for banner ad(s),
  verify that at least one first ad space has been tagged by the content provider with an indication identifiable by the access node,
  modify the first webpage to include in the first ad space a banner ad selected by the access node, when the first ad space is tagged with such an identifiable indication,
  forward the modified first webpage for subsequent display of said first webpage on the telecommunication device, thereby granting said telecommunication device access to the content provider.

An application embodied on a computer readable medium in accordance with the present system may be arranged to grant a telecommunication device access to a content provider over a telecommunication network, the content being in the form of a webpage comprising one or more ad spaces for displaying banners ads uploaded from banner ad providers when said webpage is displayed on said telecommunication device, the application comprising:

instructions for forwarding a request for a first webpage sent by the telecommunication device to the content provider, instructions for receiving the first webpage from the content provider, said first webpage comprising one or more ad spaces for banner ad(s), instructions for verifying that at least one first ad space has been tagged by the content provider with an indication identifiable by the access node, instructions for modifying the first webpage to include in the first ad space a banner ad selected by the access node, when the first ad space is tagged with such an identifiable indication, instructions for forwarding the modified first webpage for subsequent display of said first webpage on the telecommunication device, thereby granting said telecommunication device access to the content provider.

BRIEF DESCRIPTION OF THE DRAWINGS

The present system and method are explained in further detail, and by way of example, with reference to the accompanying drawings wherein.

DETAILED DESCRIPTION OF THE PRESENT SYSTEM

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

For example, the present system allows the provision of banner ads chosen by an internet service provider (ISP), and is described here after in its application to webpages. The man skilled in the art will notice that this is not the sole embodiment possible, and that the system and method according to the present system may be implemented to documents available on one or more databases, accessible through a local network. Other embodiments are readily available to the man skilled in the art.

Moreover, for the purpose of clarity, detailed descriptions of well-known devices, systems, and methods are omitted so as not to obscure the description of the present system. In addition, it should be expressly understood that the drawings are included for illustrative purposes and do not represent the scope of the present system.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. In another example, an operative coupling may include a wired and/or wireless coupling to enable communication between an access node and one or more user electronic devices such as telecommunication devices.

The present system will be illustrated hereafter with an access node that is part of an ISP architecture or network. This access node is a node or server from the ISP network that provides the telecommunication device of the present system with access to the Internet. This access node may also be called an internet gateway and could be for instance a WIFI access point or a home set top box offering a triple play service (telephone, internet and TV).

Figure 2A:
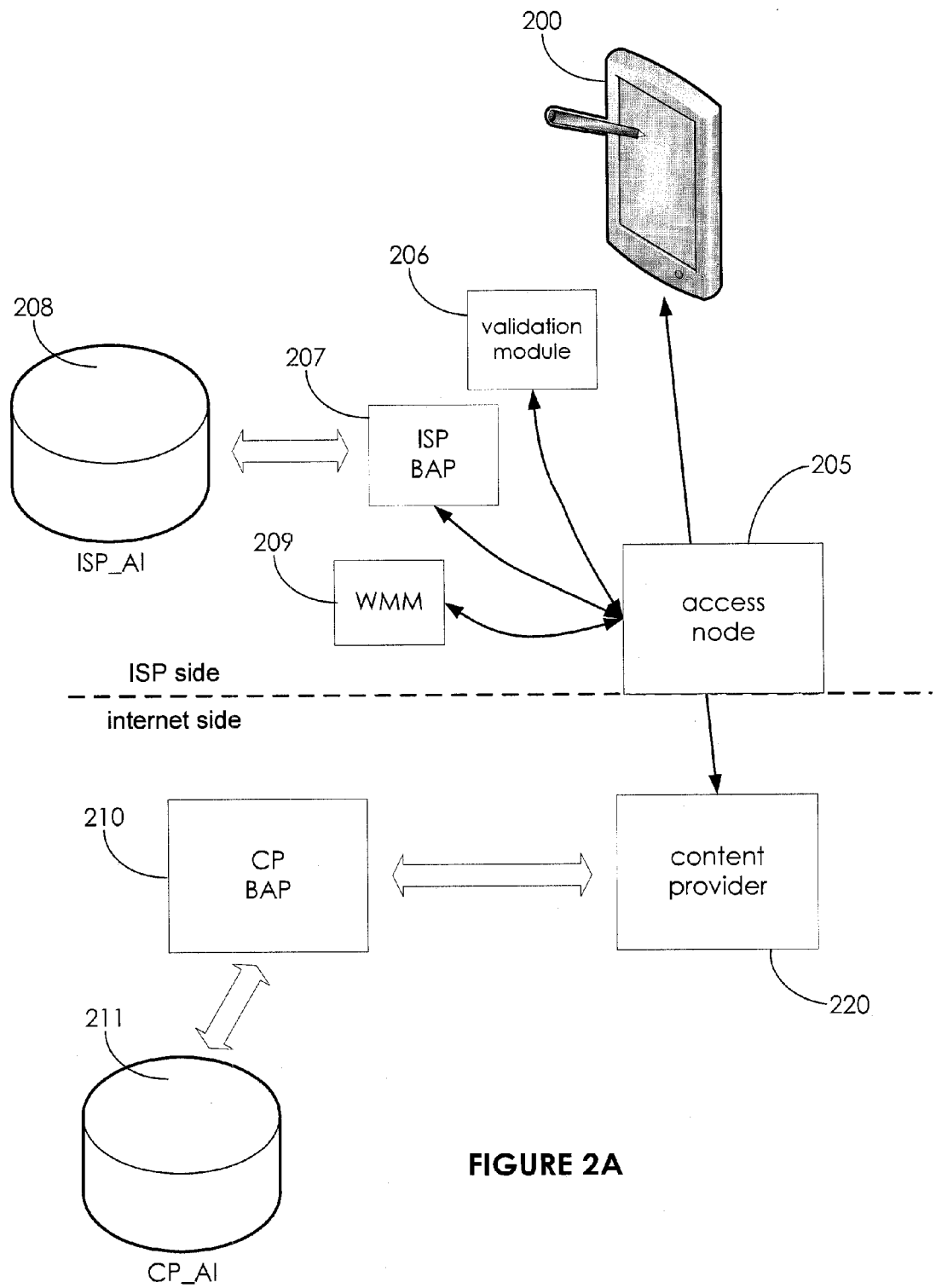
FIG. 2A shows a first exemplary embodiment of the present system for granting a telecommunication device access to a webpage of a content provider.

FIG. 2A shows an exemplary embodiment of the present system. An ISP network is illustrated on the upper part of FIG. 2A while a content provider and BAP are represented on the lower part. The content provider may be a distant node from the operator's network or part of it. The same can be said for the banner ad provider.

The ISP network may be seen as the infrastructure, such as the entire infrastructure in control of an operator, and that provides Internet services and content to users. The ISP may be a telco (Orange, AT&T, Verizon, . . . ) or a cable operator (Comcast). Users may be registered users if subscribers to the ISP or visiting users, for instance with a WIFI network. At least one gateway or access node 205 is provided to allow the users to access services and content hosted by distant nodes, like e.g., content provider 220.

A user of the ISP network may access a webpage from his telecommunication (communication in short) device 200, for instance a personal computer, a laptop, a smart phone, a PDA (personal digital assistant) and the likes.

A web page or webpage can be seen as a resource of information that is suitable for the World Wide Web and can be accessed through a web browser hosted on a communication device. This information is usually in HTML or XHTML format, and may provide navigation to other web pages via hypertext links. Web pages may be retrieved from a local computer or from a remote web server. Web pages are requested by applications running on a device, and served from web servers, seen as content providers, using Hypertext Transfer Protocol (HTTP). Web pages may consist of files of static text stored within the web server's file system (static web pages), or the web server may construct the (X)HTML for each web page when it is requested by an application such as a browser application (dynamic web pages). Client-side scripting can make web pages more responsive to user input once in the client browser. The here after banner ads are generally implemented through these client side scripting instructions uploaded with the webpage. The instructions are then executed through the web browser to retrieve a banner ad from banner ad providers.

The webpage provided by a content provider 220 may comprise one or more banner ads provided by the content provider BAP or CP_BAP 210 and taken from a plurality of stored banner ads in a content provider ad inventory CPAI 211. These ads are inserted in regions allocated by the content provider 220 when the webpage is displayed on the user communication device 200. As explained in relation to FIGS.

1A and 1B, the content provider 220 is affiliated (has agreement) with banner ad providers 210.

In the exemplary embodiment of FIG. 2A, the access node 205 may be operatively linked to:

- an ISP banner ad provider 207 or ISP_BAP. This ISP banner ad provider 207 is used by the access node 205 to provide from an ISP ad inventory ISP_AI 208 banner ads of interest to the ISP. The ISP_BAP 207 may be located within the ISP or outside the ISP network like the content provider BAP 210, and is operatively coupled to the access node 205,
- a validation module VM 206 to check if the requested webpage as received from the content provider 220 comprises at least one region or space allocated for a banner ad and that can be used by the access node 205 to insert a banner ad more suitable to the ISP interests. This allocated space, also referred to as "ad space" here after, may be tagged with an indication identifiable by the validation module 206, as explained later on,
- a webpage modification module WMM 209 for modifying the received webpage if at least one ad space has been tagged by the content provider 220. The WMM 209 with use a banner ad from ISP_AI 208 as provided by the IS_BAP 207 and includes it in the tagged ad space once the webpage is validated by the validation module 206.

The banner ad providers ISP_BAP 207 and CP_BAP 210 may be implemented through software and hosted on nodes or servers accessible over the Internet. The location of BAPs 207 and 210 in FIG. 2A (on the ISP side and internet side respectively) are for simplification purposes. The ISP_BAP is a banner ad provider the ISP has a partnership with, while the CP_BAP is a banner ad provider the content provider has a partnership with.

The validation module 206, the ISP_BAP 207 and the WMM 209 are illustrated as separated nodes or logical entities. This is a mere illustration to highlight the different functionalities under the control of the access node 205. Other embodiments are readily available to the man skilled in the art as the logical entities may be part of the same access server or hosted on operatively connected servers in the ISP network.

A behavioral profiling module (not seen in FIG. 2A) may be optionally provided with the access node 205. This profiling module may be used to select the relevant banner ad for insertion in the tagged ad space. The profiling module and the ISP banner ad provider 207 may be part of the same server or hosted on operatively connected servers in the ISP network. This profiling module may for instance:

- collect data consumed by the user who is a subscriber to the ISP services, each time this subscriber is accessing the Internet, and aggregate said data to built a network profile for the subscriber,
- collect data consumed by a user when using the access node 205 for accessing the internet. In the example of an ISP offering free access to the internet, the access node can start profiling the user as long as the user is connected through the same IP address for instance. When multiple access to simultaneous users is allowed through e.g., a WIFI access node, the behavioral profiling module may built up a profile for all users connected at the same time.

Known profiling techniques, readily available to the man skilled in the art may be used by the profile module to aggregate the collected consumed data into one or more user profiles.

In the present system, the banner ad provider 207 may be adapted to:

- select a targeted banner ad available from the ISP ad inventory 208 based on the one or more profiles built up by the here above behavioral profiling module, and/or use data characterizing the access node, such as its localization or its type of access node. For instance a WIFI access node in a coffee store, or a supermarket, will cause the ISP_BAP 207 to push ads related to coffee, or to discounts going on in that store at the moment of access to the internet,
- transmitting the targeted banner ad to the WMM 209 for insertion of the targeted banner ad in the tagged ad space of the webpage.

Figure 2B:
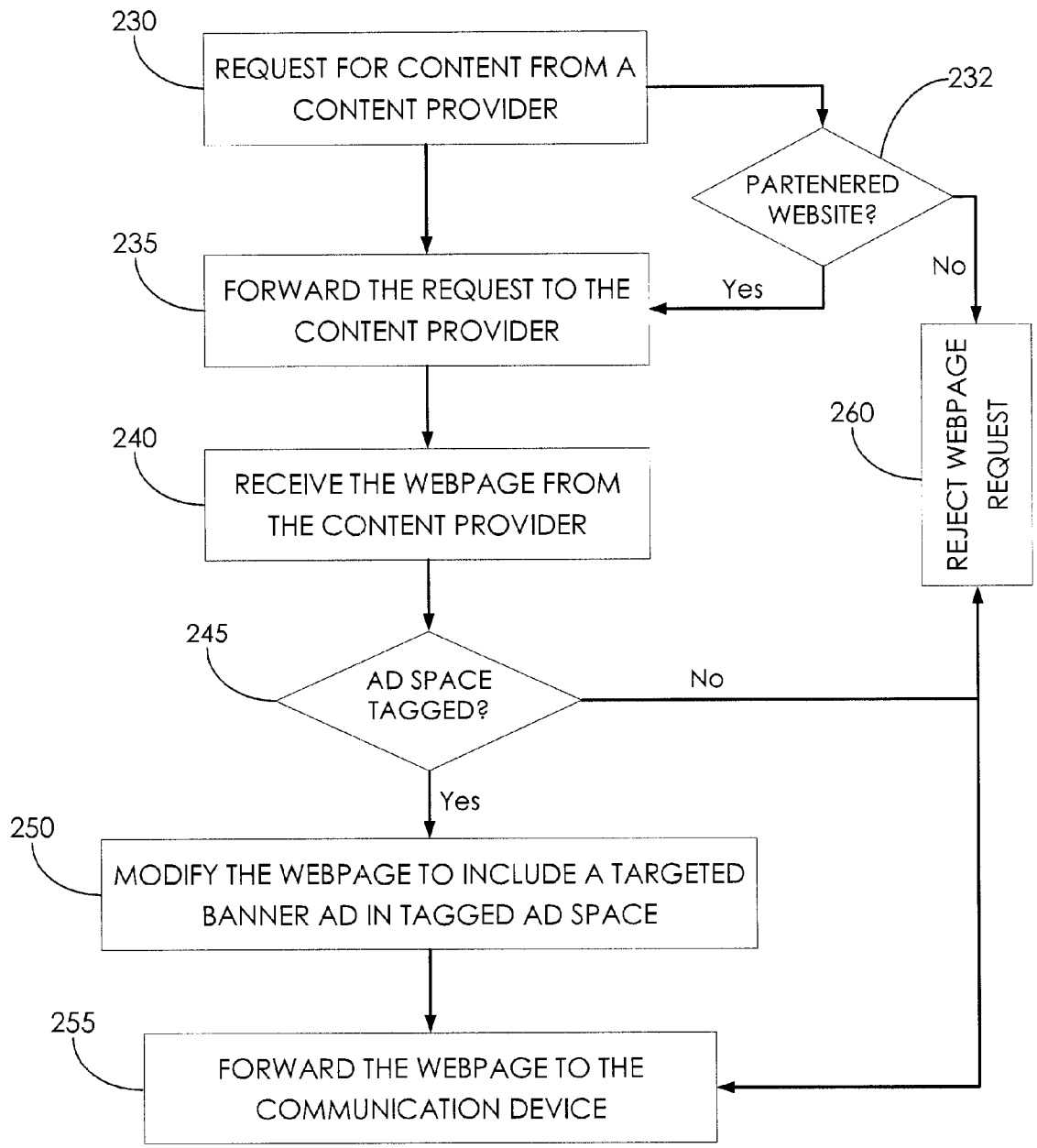
FIG. 2B shows a first exemplary embodiment of the present method for granting a telecommunication device access to a webpage of a content provider.

An exemplary embodiment of the present method is illustrated in FIG. 2B. This embodiment may be carried out by the access node 205 using the different modules it is operatively coupled to as presented in relation to FIG. 2A. Reference will be made in this illustration to the telecommunication device—communication device in short—of a user requesting access to a content provider through the access node 205. As explained before, the content is illustrated in the form of a webpage comprising one or more ad spaces for inserting banners ads uploaded from banner ad providers when the webpage is displayed on the user's communication device. The user may be a subscriber of the ISP the access node is part of. Alternatively the user may be a user visiting a telecommunication network offering access to the internet.

In a preliminary act 230, the user requests using his device 200 access to a first webpage provided by a content provider 220. This may be achieved through an http request sent to the content provider 220 over the ISP network and the internet. The request to the content provider 220 may be generated through the use of a web browser application running on the device 200. Such a request generally comprises an identifier for the content provider 220 so that the request may be sent to the right recipient.

Figure 1A:
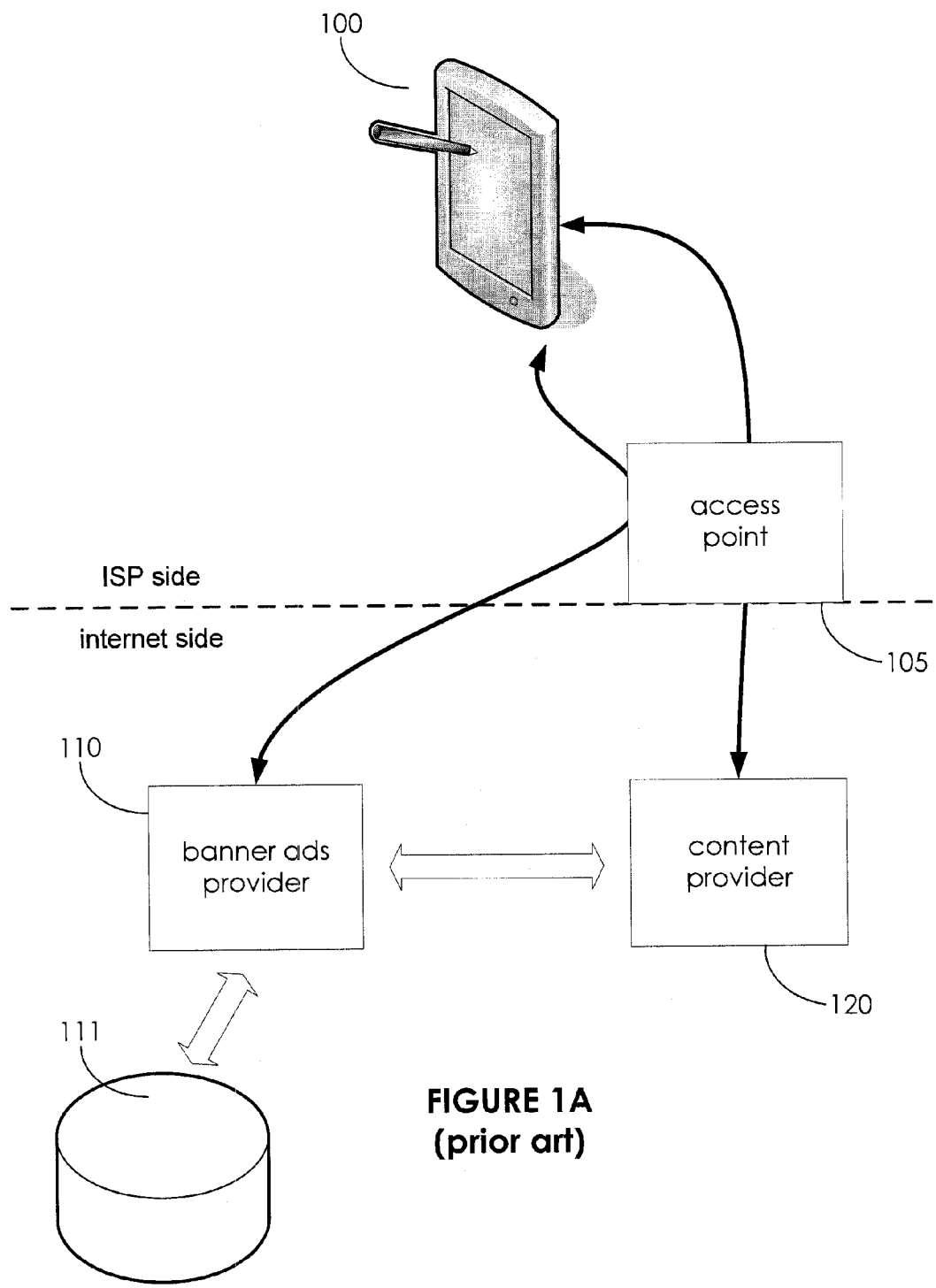
FIG. 1A shows an exemplary embodiment of a known system for providing banner ads in a webpage.
Figure 1B:
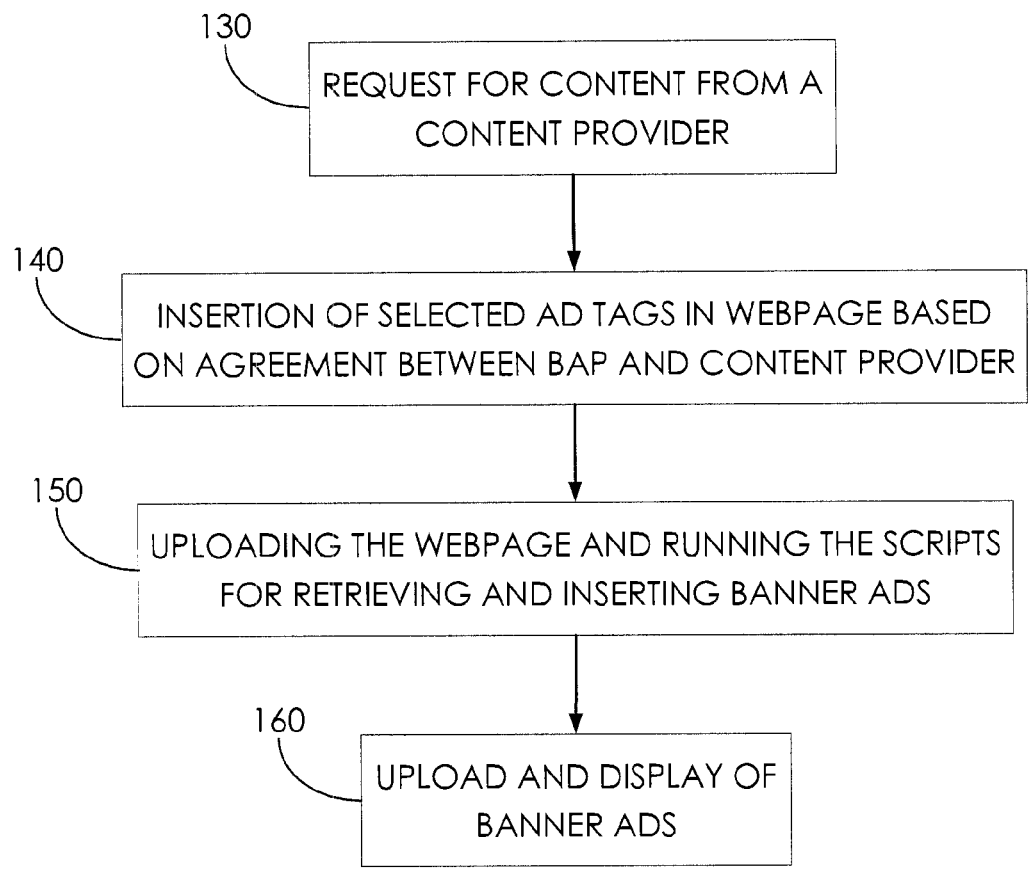
FIG. 1B shows an exemplary embodiment of a known method for providing banners ads in a webpage.

In a further act 235, the access node 205 forwards the request for the first webpage. Once the request is received on the content provider side, it will generate the first webpage. This first webpage may comprise a number of ad spaces for insertion of banner ads through scripting instructions provided by the CP_BAP 210, using known techniques as illustrated in relation to FIGS. 1A and 1B. As the present system allows the ISP to control one or more banner ads inserted in webpages provided by a content provider, it may be of interest to the ISP to define partnerships with a number of content providers. Indeed, such partner content providers will identify the ISP through the access node address in the received content request. Based on the partnership, the content provider will allocate one or more spaces in the webpage that the ISP can use for its own advertisement needs. To do so, the content provider 220 may tag such allocated spaces with an indication identifiable by the access node 205 of the ISP. This identifiable indication is a translation of the partnership between the ISP and the content providers. Such an indication gives the right to, e.g., enables, the access node 205 to include a targeted banner ad based on the ISP own needs.

One possible way to insert the identifiable element into the ad space is through the use of the HTML (Hyper Text Markup Language) div element. The div element or div tag may be seen as a block level logical division to distinguish a region of the webpage. The div element may comprise the scripting instructions for a banner ad from the CP_AI 211 and a string of text for instance, referencing the partnership number so as to be identified as the identifiable indication subsequently by the access node 205. One may note that the identifiable indication may be the banner ad itself as explained here after (see Nike® example). Alternatively, no banner ad may be inserted in the allocated space. The absence of banner ads in a space normally allocated for a banner ad may also be the indication that the access node 205 can identify.

More generally, by the test "verifying that at least one first ad space has been tagged by the content provider with an indication identifiable by the access node" of act 245, one may understand that the content provider has given away one of its ad spaces to the ISP for including the ISP own choice of banner ad (the targeted banner ad). Any indication identifiable by the access node 205 can be used by the content provider 220 to tag, i.e. mark, a given ad space for further use by the access node 205. The marking or tagging may be as simple as just an indication that the region in the webpage is an ad space but is left open with no plugin from the CP_BAP 210. Thus tagging can be understood with its general meaning, e.g., the marking of the ad space with a more or less complex indication.

If the requested webpage comprises more spaces allocated for banner ads than the number defined in the partnership between the content provider and the ISP, the content provider 220 may insert (the scripting instructions of) additional banner ads taken from the CP_BAP 210. In an additional embodiment of the present system, the content provider 220 may choose its own banner ads for all allocated spaces in the requested webpages, tagging only the requested number from the partnership with the identifiable indication. With this approach, the content provider 220 may perform its usual banner ad selection for all allocated spaces, and then in a second act, tag the one or more allocated spaces that will be used by the ISP based on the partnership.

Once the one or more ad spaces have been tagged, the content provider 220 will send the requested first webpage to the access node 205. In a further act 240, the content provider receives this first webpage, with at least a first ad space associated with a banner ad. In a subsequent act 245, the access node will check, using the validation module 206 of FIG. 2A, if the first allocated space has been tagged by the content provider 220 with an identifiable indication.

Provided no indication is identified (answer no to act 245), the access node may reject in a further act 260 the webpage request from the device 200. Alternatively, if the indication is identified (answer yes to act 245), the access node will select a banner ad, the targeted banner ad, thanks to the ISP_BAP 207. As mentioned before, this may be achieved through a profile of the user (if a subscriber or based on his history of browsing/consumption of data) and/or local characteristics of the access node 205. Once the banner ad has been chosen, in a further act 250, the access node 205 will use the WMM 209 to modify the first webpage received from the partner content provider 220 to include the targeted banner ad in the tagged ad space. In a subsequent act 255, the modified webpage is forwarded to the device 200 for subsequent display.

One can see from the present system that the access to the first webpage as requested by the communication device 200 is granted to the user if the content provider 220 (providing this webpage) has a partnership with the ISP (hosting the access node 205). This is of particular interest for an ISP offering free access to the Internet and content providers. The ISP can limit the access to partner content providers, i.e. content providers which are willing to give away at least one banner ad (in the tagged ad space) per requested webpage. Including the targeted banner ad may consist in:

inserting the scripting instructions for the targeted banner ad as provided by the ISP_BAP 207 if the content provider 220 did not insert any banner ad in the ad space, knowing that it would be replaced, replacing the existing scripting instructions (provided by the CP_BAP 210 to the content provider 220) with the instructions from the targeted banner ad, using the existing scripting instructions in case the partnership calls for the use of the same announcers, except taken from the ISP_AI 208 instead of the CP_AI 211. The WWM 209 may just have to change the ad inventory address in the scripting instructions, once the validation module 206 has identified a banner ad from a partner announcer. The identifiable indication is then the banner ad itself. For instance if the content provider chooses a NIKE® banner ad, the access node may choose to replace this NIKE® ad with a NIKE® banner ad from the local store, close to the Internet café hosting the WIFI access node.

The ISP, by offering its own choice of banner ad to the user in the tagged ad space, can hope to get a share of the advertisement revenues from the ISP banner ad providers 207.

It may be of interest for the ISP to perform a preliminary check to verify if the content provider providing the requested webpage is a partner content provider. To do so, the access node may store a predefined list of partner content providers. In an optional act 232, the access node 205 will check whether the content provider as identified from the received request for the first webpage belongs to the predefined list. Provided the content provider does not belong to the predefined list of partners (answer no to optional act 232), the access node (for instance through the validation module 206) is operable to reject the request for the first webpage from telecommunication device 200.

If the content provider belongs to the predefined list (answer yes to act 232) the present method will resume with act 235 as described before.

It may be of interest for some content provider to sign a partnership for part of the content they can provide. For instance, CNN, through its Internet website available at cnn.com, may not be a partner website to the ISP of the present system. Any CNN webpage will be rejected. This may be achieved through two routes. Either through the optional act 232 if a check of the partner content providers is performed at the access node level. In an additional exemplary embodiment of the present system, the access node 205 may reject the received webpage when no ad space tagged with the identifiable indication is found (answer no to act 245 followed by act 260 as seen in FIG. 2B). With the example of CNN, if act 232 is carried out, the request for any CNN content will be rejected right away by the access node. If act 232 is not implemented, the access node will reject the webpage received from the Internet website accessible at cnn.com as no tagged ad space will be found.

Let us assume that ESPN is a partner website. Nevertheless, as the US football pages generate a lot of revenue for ESPN, this content provider may not be willing to share any of it with the ISP of the present system. The partnership with the ISP of the present system may comprise a conditional tagging, i.e. that espn.com will tag at least one ad space (with the identifiable indication) for any webpage that is not related to US football. Practically, any ESPN webpage will pass the optional check of act 232 as ESPN is a partner website. When ESPN identifies the ISP from the access node address in the webpage request, this content provider will check for the type of content. If the type is soccer or tennis for instance, it will implement its partnership and tag at least one ad space. Whenever the type of content is related to US football, no ad space is tagged.

Through the act 245, the access node 205 will modify any non US football ESPN webpages to insert a targeted banner ad (and forward it to the device 200) while rejecting any US football ESPN pages.

In an alternative embodiment of the present system, the access node may be operable to forward the received first webpage unchanged to the telecommunication device 200 even if no ad space is tagged (answer no to act 245 followed by act 255 as seen in FIG. 2B). This alternative embodiment may be of interest to the ISP to avoid any partial access to a given content provider for its users. Nevertheless the ISP may opt to delay the rejection. For instance, after the access node 205 forwards to the device 200 an ESPN webpage without tagged ad space, a US football webpage using the hereabove example, it may send a notification or request to the content provider 220 for tagging at least one ad space with the identifiable indication in any (subsequent) webpages that the content provider would otherwise forward with no tagged ad space. With such a notification for tagging, the ISP of the present system will request the content provider to include the webpages with no tagged ad space in the partnership whenever the device 200 request further content for such pages through the access node of the present system.

Using the ESPN example, the ISP will notify ESPN to tag the ad spaces in US football webpages once the access node has granted access to a US football ESPN webpage with no tagged ad space. In an additional exemplary embodiment of the present system, the access node may reject any subsequent US football webpage received from espn.com if no ad space is tagged subsequently to the notification for tagging. The rejection may be delayed, e.g., the access node will proceed with rejecting such pages only after a given time has lapsed since the notification may be delayed through the network utilized for delivering the notification or after a given number of similar US football webpages have been requested by the users of the ISP. The notification or request to the content providers may comprise such a limitation in time or in uploaded webpages without tagged ad space.

The here above exemplary embodiments of the present method are illustrated as carried out by an access node. The present method may be performed by another node of the network that carries out the same acts, as long as the node is upstream in the webpage request sent to the content provider.

Figure 3:
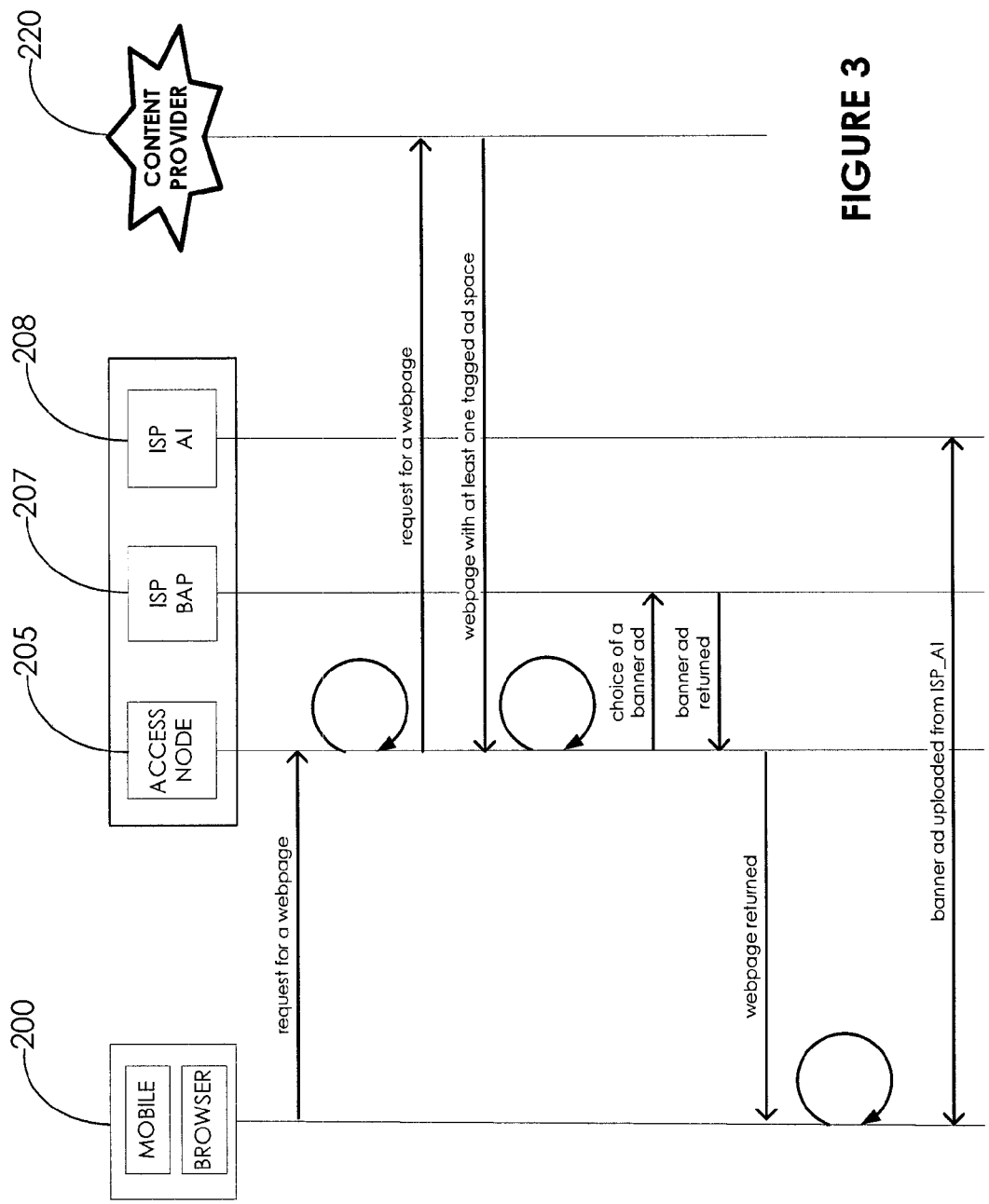
FIG. 3 shows another exemplary embodiment of the present method.

FIG. 3 is an illustration of another exemplary embodiment of the present method. A request for a webpage from the content provider is first sent by the telecommunication device 200 to the access node 205, this access node giving the device access to the Internet. A preliminary (and optional) check may be performed at the access node 205 level, to verify if the content provider is a partner content provider for the ISP hosting the access node. This corresponds to act 232 of FIG. 2B. Provided so, the request is then forwarded to the relevant content provider 220 and returned to the access node with one or more ad spaces for banner ads. A second check is performed at the access node level, to verify whether the webpage comprises at least one ad space that has been tagged by the content provider 220 with an identifiable indication giving the access node 205 control over this ad space. This corresponds to act 245 of FIG. 2B.

Provided the ad space is tagged, a banner ad plugin (scripting instructions) will be selected from the local ISP_BAP 207 under the control of the access node 205. The modified webpage, comprising the selected banner ad (i.e. the targeted banner ad) will be returned to the telecommunication device 200, thereby granting the device 200 access to that webpage. Upon display of the granted webpage on the telecommunication device, the ISP_AI 208 will be granted access to display the selected banner ad.

Figure 4:
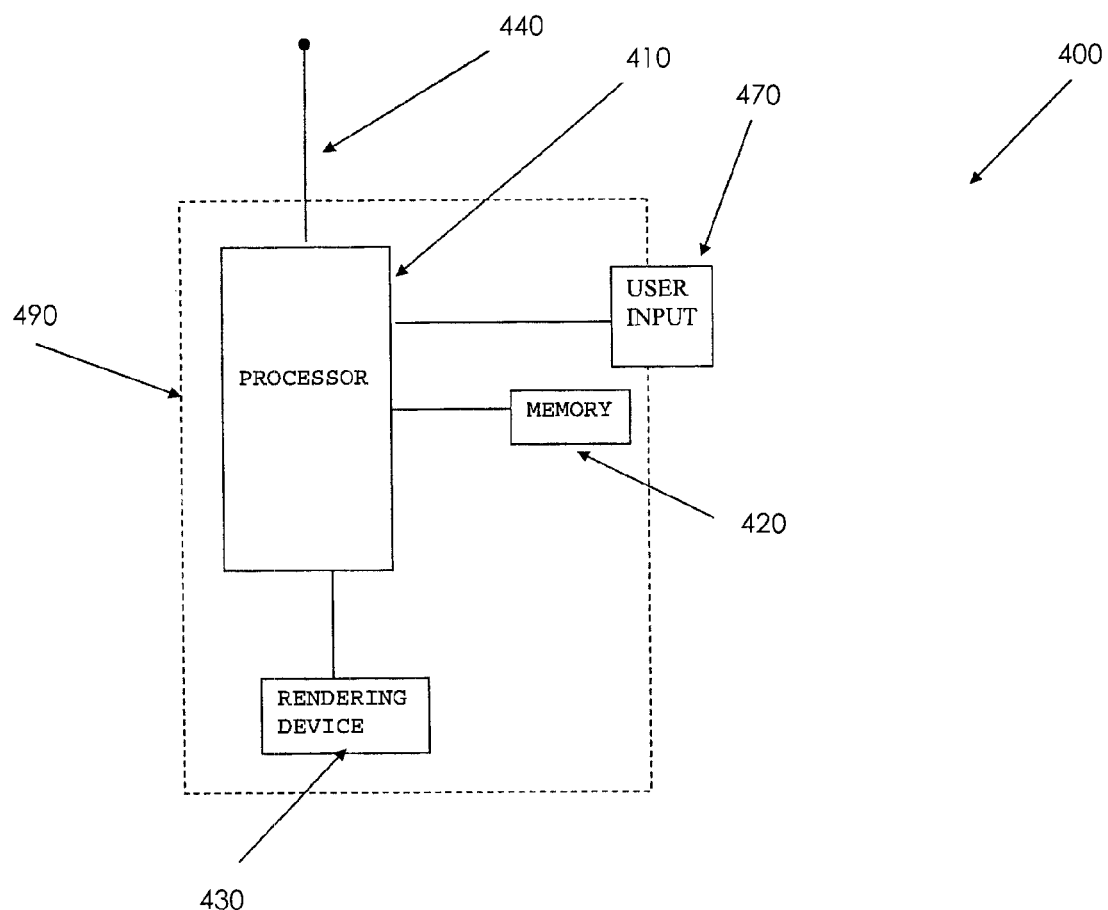
FIG. 4 shows another exemplary embodiment of the present system.

FIG. 4 shows a system 400 in accordance with an embodiment of the present system. The system 400 includes an access node 490 in a telecommunication network and implementing the present method. Access node 490 has a processor 410 operationally coupled to a memory 420, a rendering device 430, such as one or more of a display, speaker, etc., a user input device 470, such as a sensor panel, a keyboard, trackball and the likes, and a connection 440 operationally coupled to other entities and nodes of the ISP (not shown in FIG. 4). The connection 440 may be an operable connection between the access node 490 and another node or server that has similar elements as the access node 490, such as content providers like the content provider 220 of FIG. 2A.

The memory 420 may be any type of device for storing for instance the application data related to the operating system of the access node, as well as to application data in accordance with the present method. The application data are received by the processor 410 to become a special purpose processor for configuring the processor 410 to perform operation acts in accordance with the present system. The processor 410 so configured becomes a special purpose machine particularly suited for performing in accordance with the present system.

The operation acts include forwarding a request for a first webpage to the content provider, receiving the first webpage from the content provider with one of more ad spaces, verifying that at least one ad space has been tagged, modifying the tagged ad space with a banner ad selected by the access node, and forwarding the modified first webpage to the telecommunication device which requested the first webpage.

The user input 470 may include a sensor panel as well as a keyboard, mouse, trackball, touchpad or other devices, which may be stand alone or be a part of a system, such as part of a personal computer (e.g., desktop computer, laptop computer, etc.) personal digital assistant, mobile phone, converged device, or other rendering device for communicating with the processor 410 via any type of link, such as a wired or wireless link. The user input device 470 is operable for interacting with the processor 410 including interaction within a paradigm of a GUI and/or other elements of the present system, such as to enable entry of data by an operator.

Clearly the access node 490, the processor 410, memory 420, rendering device 430 and/or user input device 470 may all or partly be portions of a computer system or other device, and/or be embedded in one or more servers.

The system, device and method described herein address problems in prior art systems. In accordance with an embodiment of the present system, a telecommunication device 200 may interact with the access node 490 to request a first webpage in accordance with the present system. As may be readily appreciated, one or more telecommunication devices such as device 200 may also include a corresponding processor, memory, rendering device, user input device and operable coupling as the access node 490 and as such, the description of operation, etc. of the access node 490 should be understood to encompass a description of illustrative operable portions of the telecommunication device or users devices, suitably coupled and configured for operation in accordance with the present system.

The methods of the present system are particularly suited to be carried out by a computer software program (i.e. an application), such program containing modules corresponding to one or more of the individual steps or acts described and/or envisioned by the present system. Such program may of course be embodied in a computer-readable medium, such as an integrated chip, a peripheral device or memory, such as the memory 420 or other memory coupled to the processor 410.

The computer-readable medium and/or memory 420 may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling, etc. Any medium known or developed that can store and/or transmit information suitable for use with a computer system may be used as the computer-readable medium and/or memory 420.

Additional memories may also be used. These memories configure processor 410 to implement the methods, operational acts, and functions disclosed herein. The operation acts may include controlling the rendering device 430 to render elements in a form of a GUI and/or controlling the rendering device 430 to render other information in accordance with the present system.

Moreover, the term "memory" should be construed broadly enough to encompass any information able to be read from or written to an address in the addressable space accessed by a processor. With this definition, information on a network is still within memory 420, for instance, because the processor 410 may retrieve the information from the network for operation in accordance with the present system. For example, a portion of the memory as understood herein may reside as a portion of the content providers, and/or the user device.

The processor 410 is capable of performing operations in response to incoming request for a first webpage, and responses with the requested first webpage from the content provider, and executing instructions stored in the memory 420. The processor 410 may be an application-specific or general-use integrated circuit(s). Further, the processor 410 may be a dedicated processor for performing in accordance with the present system or may be a general-purpose processor wherein only one of many functions operates for performing in accordance with the present system. The processor 410 may operate utilizing a program portion, multiple program segments, or may be a hardware device utilizing a dedicated or multi-purpose integrated circuit.

Obviously, readily discernible modifications and variations of the present access node are possible in light of the above teachings. It is therefore to be understood that within the scope of the appended claims, the present system may be practiced otherwise than as specifically described herein. For example, while described in terms of hardware/software components interactively cooperating, it is contemplated that the present system described herein may be practiced entirely in software. The software may be embodied in a carrier such as magnetic or optical disks, or a radio frequency or audio frequency carrier wave.

For instance, in the present illustration, reference was made to an ISP. The present teachings may be easily adapted by the man skilled in the art to any operator's, such as a Telco operator, a cable operator, or any operator offering its users access, among other service, to the internet.

Thus, the foregoing discussion discloses and describes merely exemplary embodiments of the present system. As will be understood by those skilled in the art, the present system may be embodied in other specific forms without departing from the spirit or essential characteristics thereof. Accordingly, the disclosure of the present system is intended to be illustrative, but not limiting of the scope of the present system, as well as other claims. The disclosure, including any readily discernible variants of the teachings herein, define, in part, the scope of the foregoing claim terminology such that no inventive subject matter is dedicated to the public.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements can be as few as two elements, and can include an immeasurable number of elements.

What is claimed is:

1. An access node comprising:

a processor; and memory storing instructions that, when executed by the processor, configures the access node to:

grant a telecommunication device access to a content provider over a telecommunication network, the content being in the form of a first webpage comprising one or more ad spaces for displaying banner ads uploaded from banner ad providers when said webpage is displayed on said telecommunication device, wherein the access node is configured to grant access to the content as a function of whether the content provider permits the access node to modify at least one of the one or more ad spaces, wherein granting access comprises:

forwarding a request for the first webpage sent by the telecommunication device to the content provider, receiving the first webpage from the content provider, said first webpage comprising the one or more ad spaces for the banner ads inserted by the content provider, verifying that at least one first ad space of the one or more ad spaces has been tagged by the content provider with an indication identifiable by the access node giving said access node control over said first ad space, modifying the first webpage to include in the first ad space a banner ad selected by the access node, when the first ad space is tagged with such an identifiable indication, forwarding the modified first webpage for subsequent display of said first webpage on the telecommunication device, thereby granting said telecommunication device access to the content provider, sending a request to the content provider for tagging at least one ad space with the identifiable indication in any webpage that the content provider forwards subsequently to the first webpage to the telecommunication device.

2. The access node of claim 1, further configured to reject the request for the first webpage if the content provider does not belong to a predefined list of content providers.

3. The access node of claim 2, further configured to reject the received first webpage when no ad space is tagged.

4. The access node of claim 1, further configured to forward the received first webpage unchanged to the telecommunication device when no ad space is tagged.

5. The access node of claim 1, further configured to reject the webpage received from the content provider subsequently to the request for tagging if no ad space is tagged in said received webpage.

6. A method comprising:
granting a telecommunication device access to a partner content provider over a telecommunication network, the content being in the form of a first webpage comprising one or more ad spaces for displaying banners ads uploaded from banner ad providers when said webpage is displayed on said telecommunication device, said method being carried out by an access node of said telecommunication network to grant access to the content as a function of whether the content provider permits the access node to modify at least one of the one or more ad spaces, wherein granting access comprises acts of:
forwarding a request for the first webpage sent by the telecommunication device to the content provider,
receiving the first webpage from the content provider, said first webpage comprising the one or more ad spaces for banner ad(s) inserted by the partner content provider,
verifying that at least one first ad space of the one or more ad spaces has been tagged by the partner content provider with an indication identifiable by the access node giving said access node control over said first ad space,
modifying the first webpage to include in the first ad space a banner ad selected by the access node, when the first ad space is tagged with such an identifiable indication, and
forwarding the modified first webpage for subsequent display of said first webpage on the telecommunication device, thereby granting said telecommunication device access to the content provider
rejecting a further webpage received from the content provider if no ad space is tagged in said received webpage.

7. The method of claim 6, further comprising an act of rejecting the request for the first webpage if the content provider does not belong to a predefined list of content providers.

8. The method of claim 7, further comprising an act of rejecting the received first webpage when no ad space is tagged.

9. The method of claim 6, further comprising an act of forwarding the received first webpage unchanged to the telecommunication device when no ad space is tagged.

10. The method of 6, further comprising an act of sending a request to the content provider for tagging at least one ad space with the identifiable indication in any webpage that the content provider forwards subsequently to the first webpage to the telecommunication device.

11. A telecommunication system comprising:
a telecommunication device configured to request access to a content provider over a telecommunication system,
a content provider, configured to provide the requested content to the telecommunication device, the requested content being in the form of a first webpage comprising one or more ad spaces for displaying banner ads inserted by the content provider and uploaded from banner ad providers when said first webpage is displayed on said telecommunication device,
at least one banner ad provider configured to upload banner ads displayed on a webpage provided by the content provider,
an access node, wherein the access node comprises:
a processor; and
memory storing instructions that, when executed by the processor, configures the access node to grant the telecommunication device access to the content as a function of whether the content provider permits the access node to modify at least one of the one or more ad spaces, wherein granting access comprises:
forwarding a request for the first webpage sent by the telecommunication device to the content provider,
receiving the first webpage from the content provider, said first webpage comprising the one or more ad spaces for the banner ads,
verifying that at least one first ad space of the one or more ad spaces has been tagged by the content provider with an indication identifiable by the access node giving said access node control over said first ad space,
modifying the first webpage to include in the first ad space a banner ad selected by the access node, when the first ad space is tagged with such an identifiable indication, and
forwarding the modified first webpage for subsequent display of said first webpage on the telecommunication device, thereby granting said telecommunication device access to the content provider,
rejecting a further webpage received from the content provider if no ad space is tagged in said received webpage.

12. The telecommunication system of claim 11, wherein the access node is configured to reject the request for the first webpage sent by the telecommunications device if none of the one or more ad spaces is tagged with the identifiable indication.

13. The non-transitory computer readable medium of claim 11, wherein the instructions to grant access further comprise:
instructions configured to reject the request for the first webpage sent by the telecommunications device if none of the one or more ad spaces is tagged with the identifiable indication.

14. A non-transitory computer readable medium comprising an application embodied thereon that causes a computer to perform a method on a telecommunications network, when the application is executed by the computer, wherein the application comprises:
instructions to grant a telecommunication device access to a content provider over the telecommunication network, the content being in the form of a first webpage comprising one or more ad spaces for displaying banner ads uploaded from banner ad providers when said webpage is displayed on said telecommunication device, said instructions to grant access comprising:

- instructions for forwarding a request for the first webpage sent by the telecommunication device to the content provider,
- instructions for receiving the first webpage from the content provider, said first webpage comprising the one or more ad spaces for the banner ads inserted by the content provider,
- instructions for verifying that at least one first ad space of the one or more ad spaces has been tagged by the content provider with an indication identifiable by the access node,
- instructions for modifying the first webpage to include in the first ad space a banner ad selected by the access node, when the first ad space is tagged with such an identifiable indication giving said access node control over said first ad space,
- instructions for forwarding the modified first webpage for subsequent display of said first webpage on the telecommunication device, thereby granting said telecommunication device access to the content provider, and
- instructions for sending a request to the content provider for tagging at least one ad space with the identifiable indication in any webpage that the content provider forwards subsequently to the first webpage to the telecommunication device.

* * * * *